(12) United States Patent
Butlin et al.

(10) Patent No.: US 8,434,016 B2
(45) Date of Patent: Apr. 30, 2013

(54) VIRTUAL FILE SYSTEM

(75) Inventors: Stefan Geoffrey Butlin, Cambridge (GB); Nicholas Holder Clarey, Cambridge (GB); Jacob Benjamin Blaukopf, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 1518 days.

(21) Appl. No.: 10/598,168

(22) PCT Filed: Feb. 21, 2005

(86) PCT No.: PCT/GB2005/000630
§ 371 (c)(1),
(2), (4) Date: May 21, 2007

(87) PCT Pub. No.: WO2005/081132
PCT Pub. Date: Sep. 1, 2005

(65) Prior Publication Data
US 2007/0283280 A1    Dec. 6, 2007

(30) Foreign Application Priority Data
Feb. 19, 2004 (GB) .................... 0403709.9

(51) Int. Cl.
*G06F 3/00* (2006.01)
*G06F 3/048* (2006.01)
*G06F 3/14* (2006.01)

(52) U.S. Cl.
USPC .......... 715/765; 715/700; 715/764; 715/766; 715/767; 715/864

(58) Field of Classification Search ............... 715/700, 715/733, 735, 744–747, 757, 760, 764–767, 715/789, 864
See application file for complete search history.

(56) References Cited

U.S. PATENT DOCUMENTS

| | | |
|---|---|---|
| 5,694,561 A | 12/1997 | Malamud et al. |
| 6,061,576 A | 5/2000 | Terrasson |
| 6,300,947 B1 | 10/2001 | Kanevsky |
| 6,392,640 B1 | 5/2002 | Will |
| 6,470,381 B2 | 10/2002 | De Boor et al. |
| 6,678,891 B1 | 1/2004 | Wilcox et al. |
| 6,717,593 B1 | 4/2004 | Jennings |
| 6,763,382 B1 | 7/2004 | Balakrishnan et al. |
| 6,791,587 B1 | 9/2004 | Bamford et al. |

(Continued)

FOREIGN PATENT DOCUMENTS

| | | |
|---|---|---|
| EP | 1052598 | 11/2000 |
| EP | 1193590 | 4/2002 |

(Continued)

OTHER PUBLICATIONS

File System Definition, accessed Mar. 11, 2010, 1 page.*

(Continued)

*Primary Examiner* — Matt Kim
*Assistant Examiner* — Yongjia Pan
(74) *Attorney, Agent, or Firm* — Nicholas A. Cole

(57) ABSTRACT

A virtual file system is described that enables both real data resources, such as a content file, and virtual data resources, such as a field within a database or a state determined by a mark-up language element, to be accessed through a single root.

24 Claims, 6 Drawing Sheets

U.S. PATENT DOCUMENTS

| | | | |
|---|---|---|---|
| 6,850,255 | B2 | 2/2005 | Muschetto |
| 6,901,441 | B2 | 5/2005 | Bent et al. |
| 6,917,878 | B2 | 7/2005 | Pechatnikov et al. |
| 6,954,652 | B1 | 10/2005 | Sakanashi |
| 6,973,457 | B1 | 12/2005 | Bastawala et al. |
| 6,993,362 | B1 | 1/2006 | Aberg |
| 6,996,800 | B2 | 2/2006 | Lucassen et al. |
| 7,010,758 | B2 | 3/2006 | Bate |
| 7,113,981 | B2* | 9/2006 | Slate ............................ 709/217 |
| 7,219,305 | B2 | 5/2007 | Jennings |
| 7,412,658 | B2 | 8/2008 | Gilboa |
| 7,457,822 | B1* | 11/2008 | Barrall et al. ......................... 1/1 |
| 7,480,869 | B2 | 1/2009 | Care |
| 7,496,645 | B2 | 2/2009 | Yeung et al. |
| 7,500,198 | B2 | 3/2009 | Mathews et al. |
| 7,543,235 | B2 | 6/2009 | Novak et al. |
| 2002/0041292 | A1 | 4/2002 | Son et al. |
| 2002/0063738 | A1 | 5/2002 | Chung |
| 2002/0109718 | A1 | 8/2002 | Mansour et al. |
| 2002/0137502 | A1* | 9/2002 | Cronin et al. ................ 455/419 |
| 2002/0151327 | A1* | 10/2002 | Levitt ............................ 455/556 |
| 2002/0196266 | A1 | 12/2002 | Mou et al. |
| 2003/0013483 | A1 | 1/2003 | Ausems et al. |
| 2003/0027592 | A1 | 2/2003 | Hashimoto et al. |
| 2003/0084121 | A1 | 5/2003 | De Boor et al. |
| 2003/0120667 | A1 | 6/2003 | Jeong et al. |
| 2003/0158969 | A1* | 8/2003 | Gimson et al. ................ 709/246 |
| 2003/0182626 | A1 | 9/2003 | Davidov et al. |
| 2003/0200254 | A1 | 10/2003 | Wei |
| 2003/0236917 | A1 | 12/2003 | Gibbs et al. |
| 2004/0034853 | A1* | 2/2004 | Gibbons et al. ............... 717/174 |
| 2004/0046789 | A1 | 3/2004 | Inanoria |
| 2004/0075693 | A1 | 4/2004 | Moyer et al. |
| 2004/0117439 | A1 | 6/2004 | Levett et al. |
| 2004/0158638 | A1 | 8/2004 | Peters et al. |
| 2004/0177063 | A1 | 9/2004 | Weber et al. |
| 2004/0261031 | A1 | 12/2004 | Tuomainen et al. |
| 2005/0021935 | A1 | 1/2005 | Schillings et al. |
| 2005/0050474 | A1 | 3/2005 | Bells et al. |
| 2005/0057560 | A1 | 3/2005 | Bibr et al. |
| 2005/0091576 | A1 | 4/2005 | Relyea et al. |
| 2005/0108648 | A1 | 5/2005 | Olander et al. |
| 2005/0108657 | A1 | 5/2005 | Han |
| 2005/0216850 | A1 | 9/2005 | Ramos et al. |
| 2005/0228871 | A1 | 10/2005 | Zom et al. |
| 2005/0277432 | A1 | 12/2005 | Viana et al. |
| 2007/0266316 | A1 | 11/2007 | Butlin et al. |
| 2007/0288856 | A1* | 12/2007 | Butlin et al. ................ 715/762 |
| 2007/0300217 | A1 | 12/2007 | Tunmer et al. |
| 2008/0037452 | A1 | 2/2008 | Tunmer et al. |
| 2008/0153468 | A1* | 6/2008 | Reilly ........................ 455/414.2 |
| 2008/0282142 | A1* | 11/2008 | Butlin et al. ................ 715/234 |

FOREIGN PATENT DOCUMENTS

| | | |
|---|---|---|
| EP | 1369842 | 12/2003 |
| GB | 2293951 | 4/1996 |
| KR | 20010070863 A | 7/2001 |
| WO | WO0142909 | 6/2001 |
| WO | WO0155889 | 8/2001 |
| WO | WO0161508 A1 | 8/2001 |
| WO | WO 01/95041 A1 * | 12/2001 |
| WO | WO02093877 A1 | 11/2002 |
| WO | WO03067427 | 8/2003 |
| WO | WO03067527 A1 | 8/2003 |
| WO | WO03077140 | 9/2003 |
| WO | WO2007082190 | 7/2007 |

OTHER PUBLICATIONS

What's New in BREW Version 2.0, Dec. 4, 2002, 4 pages.*

Microsoft Corporation: "Microsoft Windows 2000 Professional Resource Kit", Feb. 2, 2000, Microsoft Press, Redmond, XP002606217, ISBN: 1572318082, pp. 348-349.

Aina, L., et al., "Growth of High Purity InP and Fabrication of High Sensitivity InP/GaInAs Heterojunction Phototransistors on Silicon by OMVPE" Online! XP000238840 Retrieved from the Internet: URL:http:www.msmobiles.com> Retrieved on Nov. 28, 2003! The whole document retrieved on May 18, 2005, pp. 118-121, Publication date is May 28, 2003.

Bailey E.C., "Maximum RPM—Taking the Red Hat Package Manager to the Limit" RPM Documentation, Jun. 1998, pp. 3-13, 16-18, 33, 52, 200, 237-239, XP002351753.

Bickmore T et al: "Web Page Filtering and Re-Authoring for Mobile Users" Computer Journal, Oxford University Press, Surrey, GB, vol. 42, No. 6, 1999, pp. 534-546, XP000920338.

Edward Bailey, "Maximum RPM Taking the Red Hat Package Manager to the Limit", 2000.

International Search Report and Written Opinion—PCT/GB2005/000630, International Search Authority—European Patent Office—Jun. 2, 2005.

Marjan Hericko et al., "Object Serialization Analysis and comparison in Java and .NET", ACM, Aug. 2003.

Moors T, "The Smartphone Interactive Group Audio with Complementary Symbolic Control" Lecture Notes in Computer Science, Springer Verlag, New Yor, NY, vol. 2458 pp. 100-112 Apr. 3, 2002.

Sapiro M: "Re: setting executable bit on uploaded file—Message-ID: (38FC82EE.7C8C188C@value. net>" USENET Message, 'Online! Apr. 18, 2000, XP002351754 comp.protocols.kermit.misc Retrieved from the Internet: URL:http://groups.google.com/group/comp.protocols.kermit.misc/msg/6d11eead89ed8ef?dmode=source&hl=en>' retrived on Oct. 28, 2005.

* cited by examiner

VIRTUAL FILE SYSTEM

FIELD OF THE INVENTION

The present invention relates to a virtual file system and in particular to a virtual file system for mobile devices for use with a mobile communications network.

BACKGROUND OF THE INVENTION

One of the growth areas for mobile network operators and content providers is the provision of ringtones, wallpapers and other multimedia content for mobile telephones and devices. There is a tension between the needs of mobile network operators and device manufacturers to retain control over some aspects of the device user interfaces for branding purposes and the needs of users to customize and modify the appearance of their devices to suit their own needs. The sophisticated software required to provide the desired flexibility and customization is also in tension with the limited processing power and data storage capacity of typical mobile devices. The present invention seeks to mitigate these problems.

SUMMARY OF THE INVENTION

According to a first aspect of the present invention there is provided a device comprising a storage means for storing a plurality data resources, a file system for organizing the plurality data resources stored in the storage means and a user interface for providing user access to the plurality data resources, wherein the file system comprises one or more locations comprising one or more locations comprising directly addressable data resources and one or more locations comprising indirectly addressable data resources, the indirectly addressable data resources being accessible through a data provider and being configured, in use, to provide a single interface from the user interface to both directly addressable data resources and indirectly addressable data resources.

The directly addressable data resources may comprise data content files which, in use, are displayed within the user interface. The indirectly addressable data resources may comprise a database and, in use, the result of one or more queries is displayed within the user interface. Furthermore, the indirectly addressable data resources comprise a mark-up language element and, in use, the mark-up language element is rendered and the associated result is displayed within the user interface.

According to a second aspect of the present invention there is provided a method of for storing a plurality of data resources within a file system of a device, the method comprising the steps of: defining one or more locations comprising one directly addressable data resources; defining one or more locations comprising indirectly addressable data resources, the indirectly addressable data resources being accessible through a data provider; wherein file system provides a single interface from the user interface to access both the directly addressable data resources and indirectly addressable data resources access.

According to a third aspect of the present invention there is provided a data carrier comprising computer executable code for performing the above-described method(s).

DETAILED DESCRIPTION OF THE INVENTION

Figure 1:
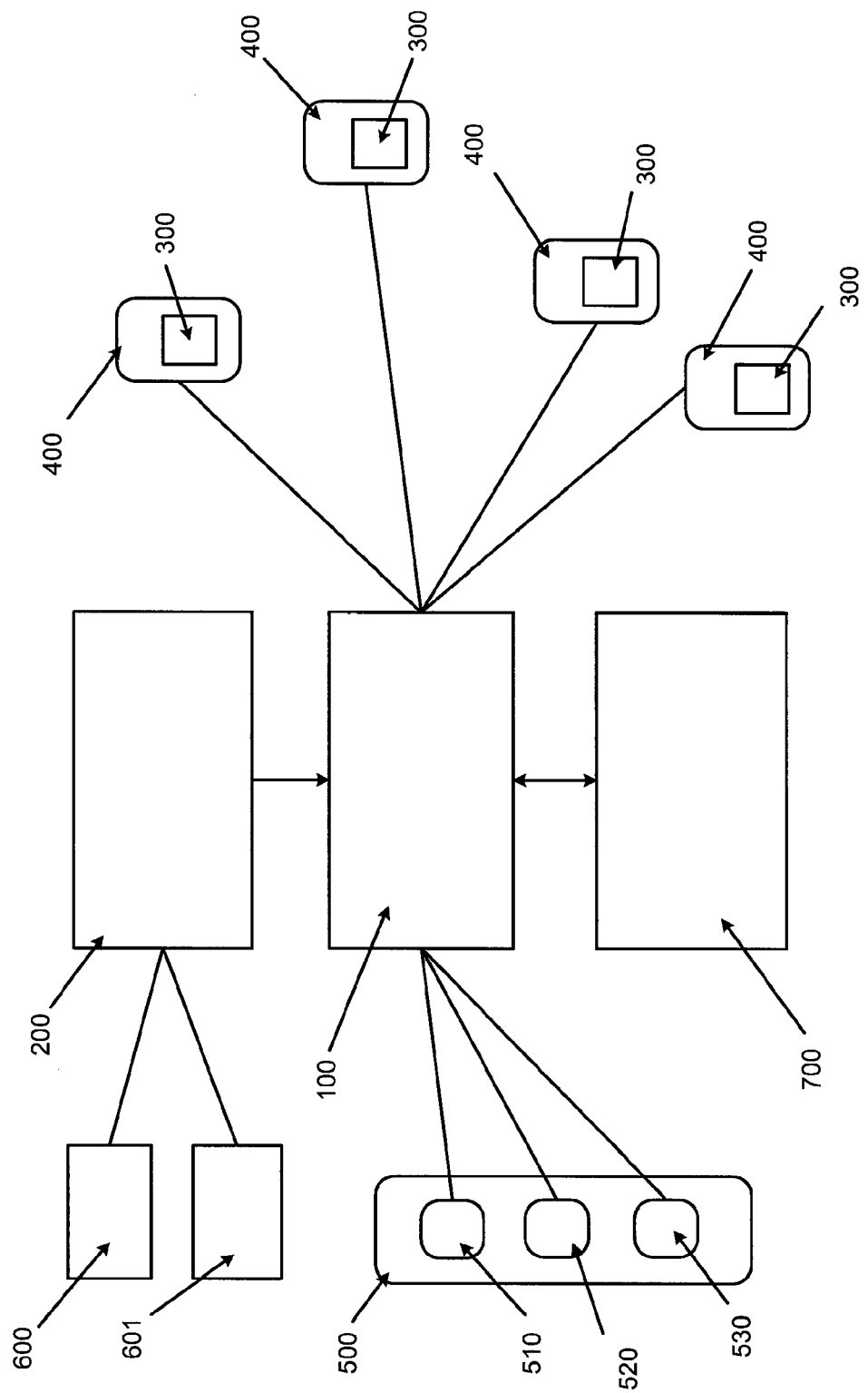
FIG. 1 shows a schematic depiction of a system incorporating the present invention.

The invention will now be described by way of illustration only and with respect to the accompanying drawings, in which FIG. 1 shows a schematic depiction of a system incorporating the present invention. The system comprises server 100, content toolset 200, mobile devices 300, operational support systems (OSSs) 700, content feeds 500 and user interface (UI) sources 600. In use, the server 100 communicates content data and UI data to the mobile devices 300 each of which comprise software package 400. The server 100 interfaces with OSSs 700, with the OSSs being those conventionally used to operate mobile networks, for example billing, account management, etc. The server 100 further interfaces with the content toolset 200: the content toolset receives data from UI sources 600, 601, . . . , and packages the UI data such that the server can transmit the packaged UI data to the software packages 400 comprised within the mobile devices 300. The server receives data from a plurality of content feeds 510, 520, and 530, and this data is processed and packaged such that it can be sent to the software packages 400 or so that the mobile devices 300 can access the data using the software package 400.

The system can be envisaged as being divided into three separate domains: operator domain comprises the systems and equipment operated by the mobile network operator (MNO); user domain PM comprises a plurality of mobile devices and third-party domain comprises the content feeds and UI feeds that may be controlled or operated by a number of different entities.

Figure 2:
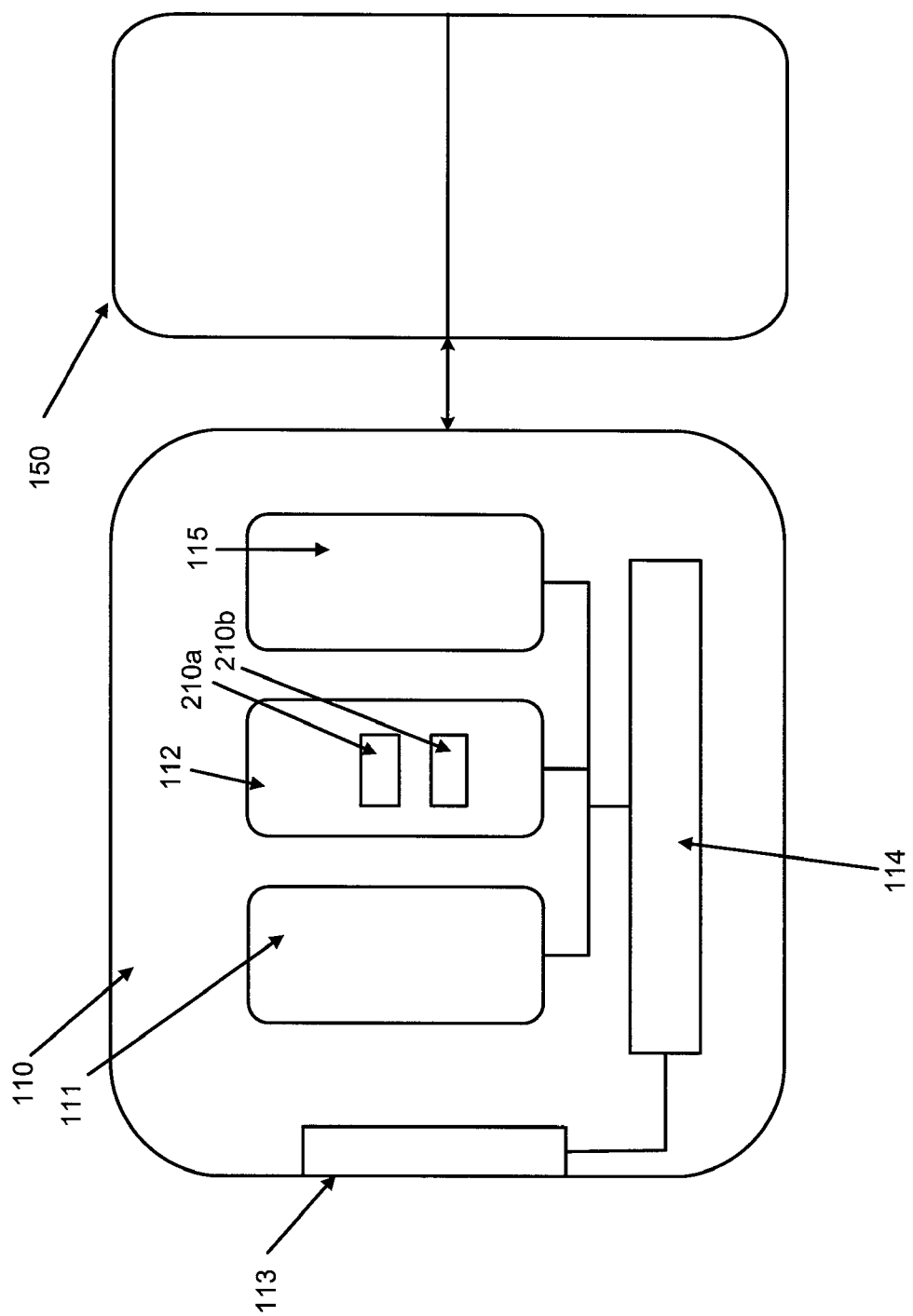
FIG. 2 depicts in greater detail the structure and operation of server 100.

FIG. 2 depicts in greater detail the structure and operation of server 100. Server 100 comprises publishing component 110 and content server component 150. Publishing component comprises database 111, import queue 112, content toolset interface 113, user interface 114 & catalogue 115. In operation, the publishing component receives content from the content toolset at the content toolset interface. The content is presented in the form of a parcel 210a, 210b, (see below) comprising one or more Trigs and one or more Triglets. A trig is a user interface for a mobile device, such as a mobile telephone and a triglet is a data file that can be used to extend or alter a trig. If a parcel comprises more than one trig then one of the Trigs may be a master trig from which the other Trigs are derived.

The publishing component user interface 114 can be used to import a parcel into the database 111, and this process causes references to each trig and triglet to be loaded into the import queue 114, which may comprise references to a plurality of parcels 210a, 210b, . . . . The contents of the parcel may be examined using the user interface and the contents of the parcel can be passed to the catalogue.

Figure 3:
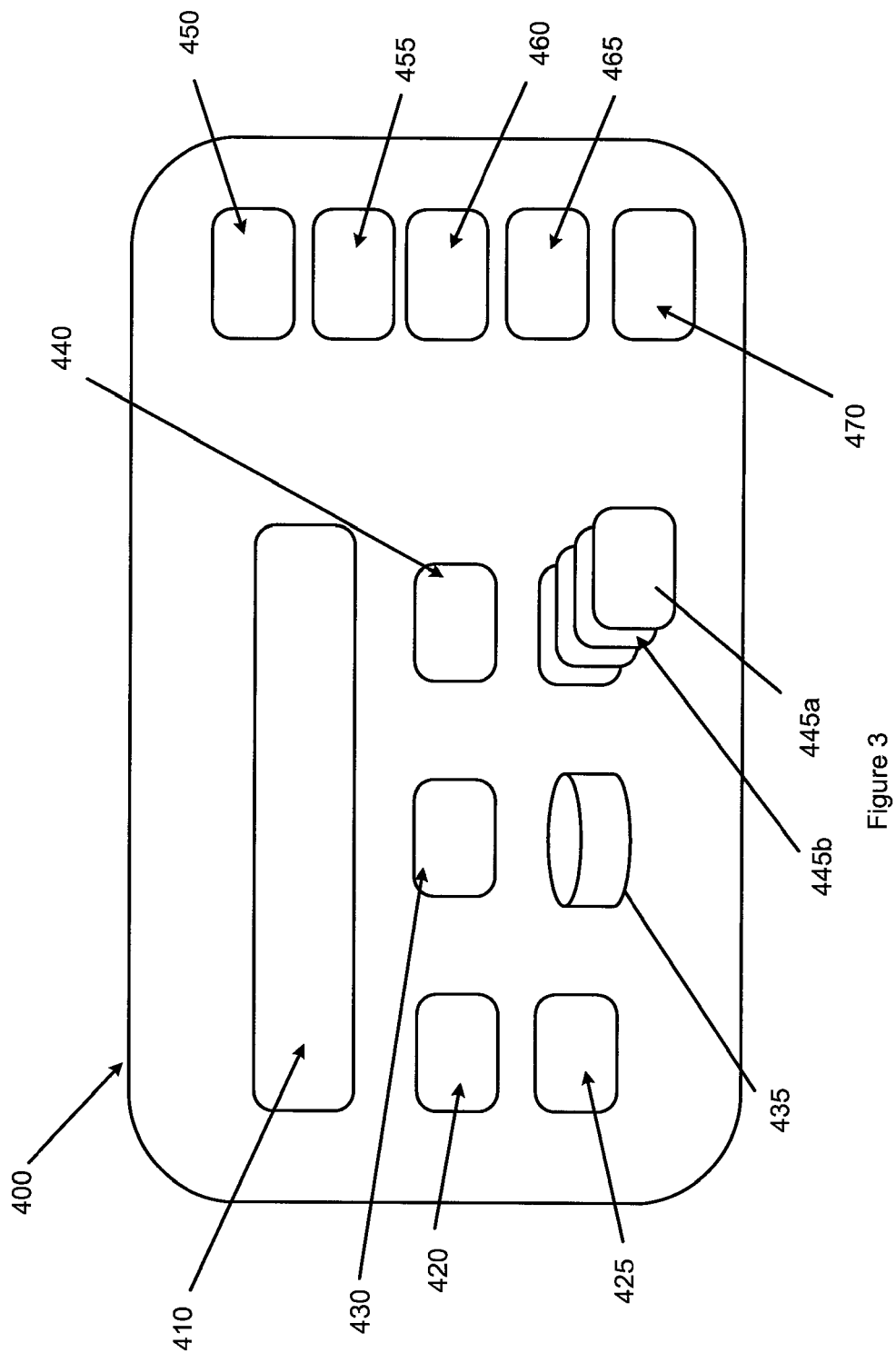
FIG. 3 shows a schematic depiction of the software 400 for the mobile devices 300.

FIG. 3 shows a schematic depiction of the software 400 for the mobile devices 300, which comprises a mark-up language renderer 410, update manager 420, network communication agent 425, resource manager 430, virtual file system 435, actor manager 440, a plurality of actors 445a, 445b, . . . , native UI renderer 450, support manager 460, trig manager 465 and mark-up language parser 470.

It is preferred that the software operates using TrigML, which is an XML application and that mark-up language renderer 410 renders the TrigXML code for display on the mobile device 300. The mark-up language renderer also uses the TrigML Parser to parse TrigML resources, display content on the device screen and controlling the replacement and viewing of content on the handset. The native UI renderer is used to display UI components that can be displayed without the use of TrigML, and for displaying error messages.

The software 400 is provisioned and installed in a device specific manner. For example for a Nokia Series 60 device the software is installed using a SIS file, whereas for a MS Smartphone device the software is installed using a CAB file.

Similarly, software upgrades are handled in a device specific manner. The software may be provisioned in a more limited format, as a self-contained application that renders its built in content only: i.e. the software is provisioned with a built-in trig but additional trigs cannot be added later. The supplied trig may be upgraded over the air.

The trig manager 465 presents an interface to the resource manager 430 and the mark-up language renderer. It is responsible for trig management in general. This includes: persisting knowledge of the trig in use, changing the current trig, selection of a trig on start-up, selection of a further trig as a fall back for a corrupt trig, maintaining the set of installed trigs, identifying where a particular trig is installed to the resource manager and reading the update channel definitions of a trig and configuring the update manager appropriately.

The resource manager provides an abstraction of the persistent store on device, i.e. storing the files as real files, or as records in a database. The resource manager presents a file system interface to the mark-up language renderer and the update manager. It is responsible for handling file path logic, distinguishing between real resource files and actor attributes, mapping trig-relative paths onto absolute paths, interfacing with the trig manager and providing a modification interface to the update manager.

The Resource Manager is also responsible for ensuring the integrity of the resources stored in the persistent store, especially in the face of unpredictable interruptions such as loss of device power. The Resource Manager has no knowledge of the trig currently used. Its interface is thread safe (as it may be used by both the Update Manager and the Renderer from different threads.

The Update Manager handles the reception and application of Trigs and Triglets. The Update Manager presents an interface to the Renderer and the trig Manager and is responsible for: the initiation of manual updates when instructed to by the Renderer; controlling and implementing the automatic update channel when so configured by the trig manager; indicating the progress of a manual update and recovering an Update following unexpected loss of network connection and/or device power. The update packet format may be defined as a binary serialization of an XML schema.

The Support Manager provides an interface for other components to report the occurrence of an event or error. Depending on the severity of the error, the Support Manager will log the event and/or put up an error message popup XML is a convenient data formatting language that is used to define the update packet format as well as TrigML content. For bandwidth and storage efficiency reasons, text XML is serialized into a binary representation. Both update packets and TrigML fragments are parsed by the same component, the mark-up language parser. Any further use of XML in the software must use the binary XML encoding and therefore re-use the parser.

The Actor Manager 440 looks after the set of actors 445 present in the software. It is used by: the renderer when content is sending events to an actor; actors that want to notify that an attribute value has changed and actors that want to emit an event (see below).

The software may comprise a multi-threaded application running a minimum of two threads, with more possible depending on how many and what sort of actors are included. The software runs mostly in one thread, referred to as the main thread. The main thread is used to run the renderer which communicates synchronously with other components. Actors always have a synchronous interface to the Renderer. If an actor requires additional threads for its functionality, then it is the responsibility of the Actor to manage the inter-thread communication. It is preferred that a light messaging framework is used to avoid unnecessary code duplication where many actors require inter-thread communication.

In addition to the main thread, the update manager runs a network thread. The network thread is used to download update packets and is separate from the main thread to allow the renderer to continue unaffected until the packet has arrived. The Update Manager is responsible for handling inter-thread messaging such that the Update Manager communicates synchronously with the Renderer and Resource Manager when applying the changes defined in an Update Packet.

The memory allocation strategy of the software is platform specific. On MIDP platforms, the software simply uses the system heap and garbage collector for all its memory requirements. Garbage collection is forced whenever a content replacement event occurs in an attempt to keep the garbage collection predictable and not suffer unexpected pauses in operation. It is assumed that any memory allocation might fail, in which case the software will delete all its references to objects, garbage collect, and restart—assuming that the software has already successfully started up and rendered the first page.

On C++-based platforms, a mixture of pre-allocation and on-demand allocation will be made from the system heap. All memory required for start-up is allocated on-demand during start-up, with any failures here causing the exit (with message if possible) of the software. Following successful start-up, memory needed for rendering the content document model is pre-allocated. Provided content is authored to use less than a defined limit, it is guaranteed to render. Additional use is made of RAM for various caches needed for fast operation of the software. Where memory conditions are low, these caches will be released resulting in slow rendering performance from the software.

Errors that are severe enough to disrupt the normal operation of the software must result in a pop-up dialog box. The dialog box contains one of a small number of internationalized error messages (internationalized versions of these strings may be compiled into the software at build-time with the version of an error string to display being determined by the relevant language setting on the device). To keep the number of messages to a minimum, only a few generic problems are covered.

To allow for support situations, error dialogs also display an error code as a 4-digit (16-bit) hex string. Each error code is associated with a description text that can be used by support staff to determine the nature of a problem with the software. Errors that occur in the software and that are not severe enough to halt its operation may be logged by the Support Manager component. The Support Manager can be queried by the user typing special key sequences. The Support Manager can also supply its error log to a server via an HTTP GET or POST method.

The Renderer receives information regarding the key press. If there is no behavior configured at build time for a key, it is sent as a TrigML content event to the current focus element. The content event is then handled as defined by TrigML's normal event processing logic.

For example, if a key is pressed down, a 'keypress' event is delivered to the Renderer with a parameter set to they relevant key. When the key is released, a '!keypress' event is delivered to the Renderer. If a key is held down for a extended period of time, a 'longkeypress' event is delivered to the renderer. On release, both a '!longkeypress' and a '!keypress' event are delivered to the Renderer.

Whenever the software is started, it executes the following actions:
Check for, and continue with, interrupted Update processing;
Check for, and process, Updates residing in the file system (either pre-provisioned, or installed to the file system by some other means);
If known, start the current trig (which may be the last run trig);
If a current trig is not set, a trig that has been flagged as a 'default' trig can be started.
Failing the presence of a default trig, the first valid trig by alphabetical order of name will be selected.

A trig is started by loading the defined resource name, start-up/default. The TrigML defined in start-up/default is parsed as the new contents for the content root node.

The first time a trig is run by the software following its installation, the trig is started by loading the resource name startup/firsttime. The software may record whether a trig has been run or not in a file located in the top level folder for that trig. Dependent on the platform used by the mobile device, the automatic start-up of the software may be set as a build-time configuration option. Furthermore, placing the software in the background following an auto-start may also be a build-time configuration option.

A launcher may appear to the user as an application icon and selecting it starts the software with a trig specified by that launcher (this trig may be indicated by a launcher icon and/or name). When using a launcher to start a trig, it is possible to specify an 'entry point' parameter. The parameter is a resource name of a file found in the 'start-up' folder. This file is not used if the trig has never been run before, in which case the file called 'firsttime' is used instead.

The software uses content resource files stored in a virtual file system on the device. The file system is described as virtual as it may not be implemented as a classical file-system, however, all references to resources are file paths as if stored in a hierarchical system of folders and files.

Details regarding the arrangement of the file-system are given below in Appendix A. Furthermore, the software stores some or all of the following information: usage statistics; active user counts; TrigManager state; TrigML fragments & update channel definition (serialized as binary XML); PNG images; plain text, encoded as UTF-8 OTA and then stored in a platform specific encoding; other platform specific resources, e.g. ring tone files, background images, etc.

Files in the file system can be changed, either when an actor attribute value changes, or when a file is replaced by a triglet. When files in the /attrs directory change, the Renderer is immediately notified and the relevant branches of the content tree are updated and refreshed. When images and text resources are changed, the Renderer behaves as if the affected resources are immediately reloaded (either the whole content tree or just the affected branches may be refreshed). When TrigML fragments are changed, the Renderer behaves as if it is not notified and continues to display its current, possibly out of date, content. This is to avoid the software needing to persist <include> elements and the <load> history of the current content.

The software 400 is provisioned to mobile devices in a device specific method. One or more Trigs can be provisioned as part of the installation, for example, stored as an uncompressed update packet. On start-up, the packet can be expanded and installed to the file-system.

The Actors 445 are components that publish attribute values and handle and emit events. Actors communicate with the Renderer synchronously. If an actor needs asynchronous behavior, then it is the responsibility of the actor to manage and communicate with a thread external to the main thread of the Renderer.

Actor attributes may be read as file references. Attributes are one of four types: a single simple value; a vector of simple values; a single structure of fields, each field having a simple value; or a vector of structures. Attributes may be referenced by an expression using an object member notation similar to many object-orientated programming languages:

<image res="signallevels/{protocol.signalstrength}"/>

When needed as a file, an attribute is accessed via the /attrs folder.

<text res="/attr/network/name">

An Actor can be messaged by sending it an event with the <throw> element. Events emitted by actors can be delivered to the content tree as content events: these can be targeted at an element Id or 'top'. The interface to an actor is defined by an Actor Interface Definition file. This is an XML document that defines the attributes, types, fieldnames, events-in and parameters, and events out. The set of actors is configurable at build-time for the software. Appendix B gives an exemplary listing of some actors that may be used, along with the associated functions or variables.

One of the limitations that is common in most mobile devices is that the display screen is quite small and when a menu is displayed it is not always possible to display all of the menu items on the screen at one time. Conventional approaches tend to load all of the menu items into memory, along with associated icons or graphics, and then display them appropriately as the user scrolls up or down the menu.

There is provided a technique that limits the number of menu items to be loaded into memory to the number of items that can be displayed on the screen at a time. When the user scrolls along the menu, the item(s) no longer on display are discarded and the item(s) now on display are loaded into memory.

Preferably, this can be implemented by using a <griddata> element in TrigML to define a list view of some data, where the data is stored in a folder in the file system, and the list appearance has the same structure for each item. The <griddata> element comprises a 'repeat-over' attribute that specifies the folder in which the data can be located. The single child element of <griddata> is a template for the appearance of each item in the list.

The template uses a special symbol, e.g. '$$' to refer to the iterator. This is the template variable that changes each time the template is instantiated: for example

```
<griddata repeatover="news/headlines">
    <text res="news/headlines/$$/title.txt"/>
</griddata>
``` where the folder news/headlines/ contains:
0/title.txt
1/title.txt
2/title.txt
3/title.txt This would display a list of 4 items, each described by a simple <text> element pointing the 'title.txt' resource in the 'news/headlines/$$' folder. Where the source data has more items in it than the <griddata> element has room for on the display, the <griddata> element only displays those items that can be displayed. When the user scrolls through the list, the <griddata> element shifts the 'data-window' accordingly. The advantage of this technique is that only the resources required by the current display are actually loaded in memory, which reduces the memory utilization and reduces the amount of time taken to render the list of items.

A similar scheme can be used to define the order that a list is displayed in. If the target of the 'repeat-over' attribute is a file instead of a folder, then the file can be assumed to contain a list of resource names to use in the iteration. For example,

```
<griddata repeatover="football/league">
    <text res="football/teams/$$/name.txt"/>
</griddata>
``` where the file football/league contains:
Manchester
Arsenal
Chelsea
the folder football/teams/ contains:
Manchester/name.txt
Arsenal/name.txt
Chelsean/name.txt
and each name.txt is a text file holding the team name. The result of this is that the test files associated with the teams would be displayed in the defined order and within the defined area of the device display.

The software utilize a virtual file system 435, which allows a conventional file system to be incorporated with other forms of data such that data stored in any part of the virtual file system can be accessed in a common fashion. Examples of non-conventional data storage that can be integrated within such a virtual file system include data stored within a database or data that it generated on demand by a further software component.

For example, in conventional mobile devices, information regarding the battery strength, signal strength, new text messages, etc. are shown to the use and this information is typically obtained by the operating system sending a call to the relevant hardware or software entity and the UI interpreting the received answer and displaying it.

This information may be displayed in the UI using a TrigML tag (see below), such as <phonestatus> (or <signalstrength>). Rendering this tag causes a listening query to be opened to the relevant hardware or software entity. If a change in state occurs then the UI renderer is notified and the UI renderer loads the relevant icon or graphic to communicate the change in state to the user. If the user changes the view within the UI the tag may be withdrawn and the listening query is terminated. This approach is more resource efficient as the listening query is only active when the tag is in use.

The virtual file system comprises a single root which contains both directly addressable data resources, such as content files (for example, text, graphics, video, audio, etc.), and indirectly addressable data resources, such as TrigML tags or data stored within a database. This provides a user with a unified view through the user interface that enables the user to access the different types of data held within the virtual file system. Whilst the different data types are presented to the user in this manner, the data can still be stored in a method that enables efficient data storage and retrieval.

For commercial reasons it is desirable for MNOs and/or content providers to be able to have some control over the user interface that will be displayed on the screen of a mobile device. It is also important that there is a degree of flexibility that allows users to download triglets or new trigs to modify the appearance of their device and also to make further changes to the displayed image that is determined by the trig or triglet in use.

This problem can be addressed by considering the UI to be formed from a number of hierarchical planes, each of the levels comprising one or more entities of the UI. By assigning a hierarchy to the MNO, device manufacturer, trig provider and the device user it is possible to provide the required levels of permission.

Figure 5:
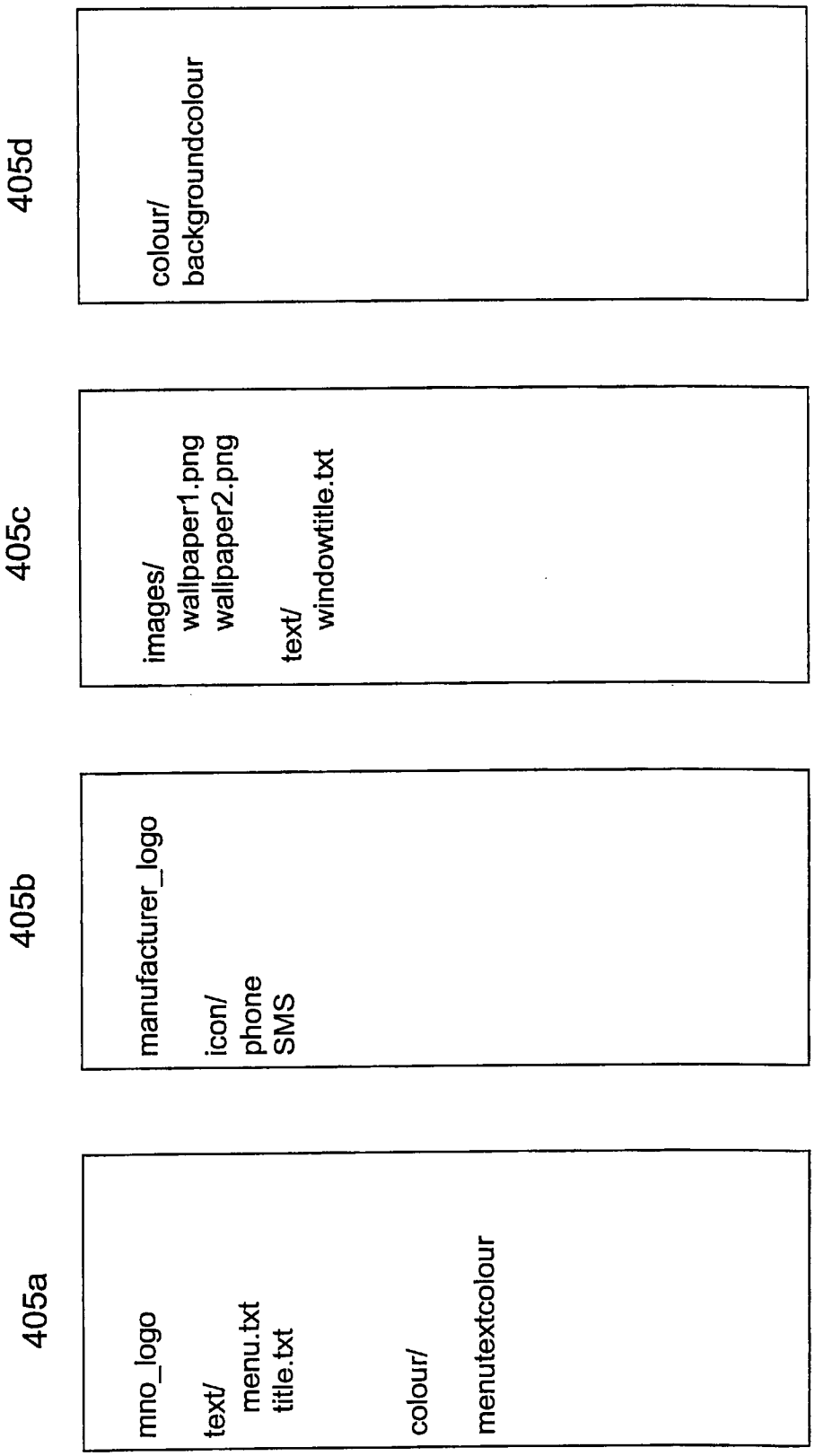
FIG. 5 shows a schematic depiction of four hierarchical planes.

FIG. 5 shows a schematic depiction of four hierarchical planes 405*a-d*: plane 405*a* comprises UI elements defined by the MNO; plane 405*b* comprises UI elements defined by the device manufacturer; plane 405*c* comprises UI elements defined by a trig; and plane 405*d* comprises UI elements defined by the user. Plane 405*a* has the highest position in the hierarchy and plane 405*d* has the lowest position in the hierarchy. For example, the mno_logo element in plane 405*a* defines the graphic element used and its position on the display screen of the device. As it is in the highest plane of the hierarchy it will always appear and will take preference over any other UI element in a lower hierarchy element that attempts to use the pixels used by mno_logo. Plane 405*d* comprises the backgroundcolour element, which is not defined in any of the other planes and thus the colour defined in backgroundcolour will be used in the UI.

Plane 405*c* comprises the windowtitle.txt element that defines the attributes for the text used in the title of a window. This may be overwritten by adding a windowtitle.txt element to either plane 405*a* or 405*b* to define the text attributes, or by adding a windowtitle.txt_deleted element to either plane 405*a* or 405*b* to instruct the UI renderer to ignore any subsequent windowtitle.txt element.

The user can set a preference within the software 300 to control the content that is displayed within the UI. For example, content relating to a number of football teams may be stored on a server with a path having a form similar to /demoUI/football/team_xxxx/team_menu.png where the team_xxxx variable is selected by the user from a list of teams (manu, chel, leed, manc, etc.) and inserted into the path such that the UI displays the content related to the selected team. A change in the team_xxxx variable will cause the content displayed to altered accordingly. It should be noted that the selection of a preference controls the display of content that is selected from content stored on a remote server, as opposed to selecting from content that is stored on local storage.

This approach is preferable to sending a request of the form
http://t1.trigenix.com/triglets/football/
triglet&pn="07766554 43322"

as in this case the server needs to perform a database query in order to identify the content to be displayed and this will significantly increase the resources required from the server to provide the requested content.

Another known technique by which the same result can be achieved is to send a request of the form:

http://t1.trigenix.com/triglets/football/triglet&fc='ManU' but a disadvantage of this approach is that each time a new team is added then the server logic must be updated to include the new team. In contrast, this method requires that content is added to the server at a new location, which is a simpler process and requires fewer resources to implement it.

Updates comprise a new trig (a new or replacement UI) or a triglet (a modification to an existing trig) and may be regarded as modifications to the software file-system. The Update Manager to determine what needs changing in the file-system by reading a packet. Update Packets may be downloaded over the air by the software 400 using HTTP, or other suitable transport mechanisms, wrapped in a device-specific package format or pre-provisioned with the installation of the software itself.

Updates may be triggered by a number of means, which include
- the software checking for interrupted Update processing on start-up
- the software checking for pre-installed Update Packets on start-up
- automatically as configured by an Update Channel
- user initiation
- the device receiving a special SMS The algorithm used to unpack and install an update is device specific. However, it is important that the algorithm is safe from unexpected interruption (e.g. power loss), such that no corruption or unrecoverable state is reached in the file-system. This may be achieved by using two threads (a network thread and a renderer thread) with the goal of having as much of the update processing as possible being performed by the network thread so as to interrupt the renderer thread for the shortest possible amount of time.

TrigML fragments are files containing text TrigML and resource references inside these fragments are virtual file paths. The mapping of these virtual file paths to real file paths is defined by a TrigDefinition file. This file also defines other properties of the trig. When used for compiling a triglet, this file also defines how the input TrigML/PNG/Text resources map onto modifications of the virtual file-system of a trig. For PNG and Text Resources the trig Definition file points at a list of real files on the host file-system and the resources are copied to the outputs.

TrigML can use constant variables instead of attribute values. Constant variables are accessed with the same syntax as <include> parameters, e.g. $background_colour. Constants are treated as global variables in a trig and are defined in the reserved folder, constants/. The variable definitions contained in the files in the constants/ folder may be resolved at compile time with direct substitution of their values. Alternatively the variable definitions in constants/are compiled as global variables and resolved at content parse time by the software. This allows the trig to be updated by a simple replacement of one or all of its constants files.

A System String Dictionary defines the integer values to use for all well known strings, i.e. reserved words. These have several types, including: TrigML element and attribute names ('group', 'res', 'layer', 'image', 'x'), TrigML attribute values (e.g.: 'left', 'activate', 'focus') and common resource paths (e.g.: 'attr', 'start-up', 'default'). As an input, the String Dictionary is optional. The first time a trig is compiled it will not have a String Dictionary. This first compilation creates the String Dictionary, which is then used for all future compilations of that trig. Triglet compilation must have a String Dictionary that defines all the string mappings used by the trig it is modifying.

In order to successfully render the user interface of a mobile device, the mark-up language must have the following qualities: concise page definitions, consistent layout rules, be implementable in a compact renderer, provide multiple layering and arbitrary overlapping content, event model, require the repaint of only the areas of the display that have to change between pages of the UI, include hooks to the platform for reading property values receiving events and sending events, extensible, and be graphically flexible. TrigML provides these features and our co-pending application GB0403709.9, filed Feb. 19, 2004, gives an overview of the elements and attributes that provide the desired functionality.

It is desirable that the cost of re-branding UIs and producing a continual stream of updates is minimal. This is enabled by providing an efficient flow of information from the creative process through to the transmission of data to users.

Figure 4:
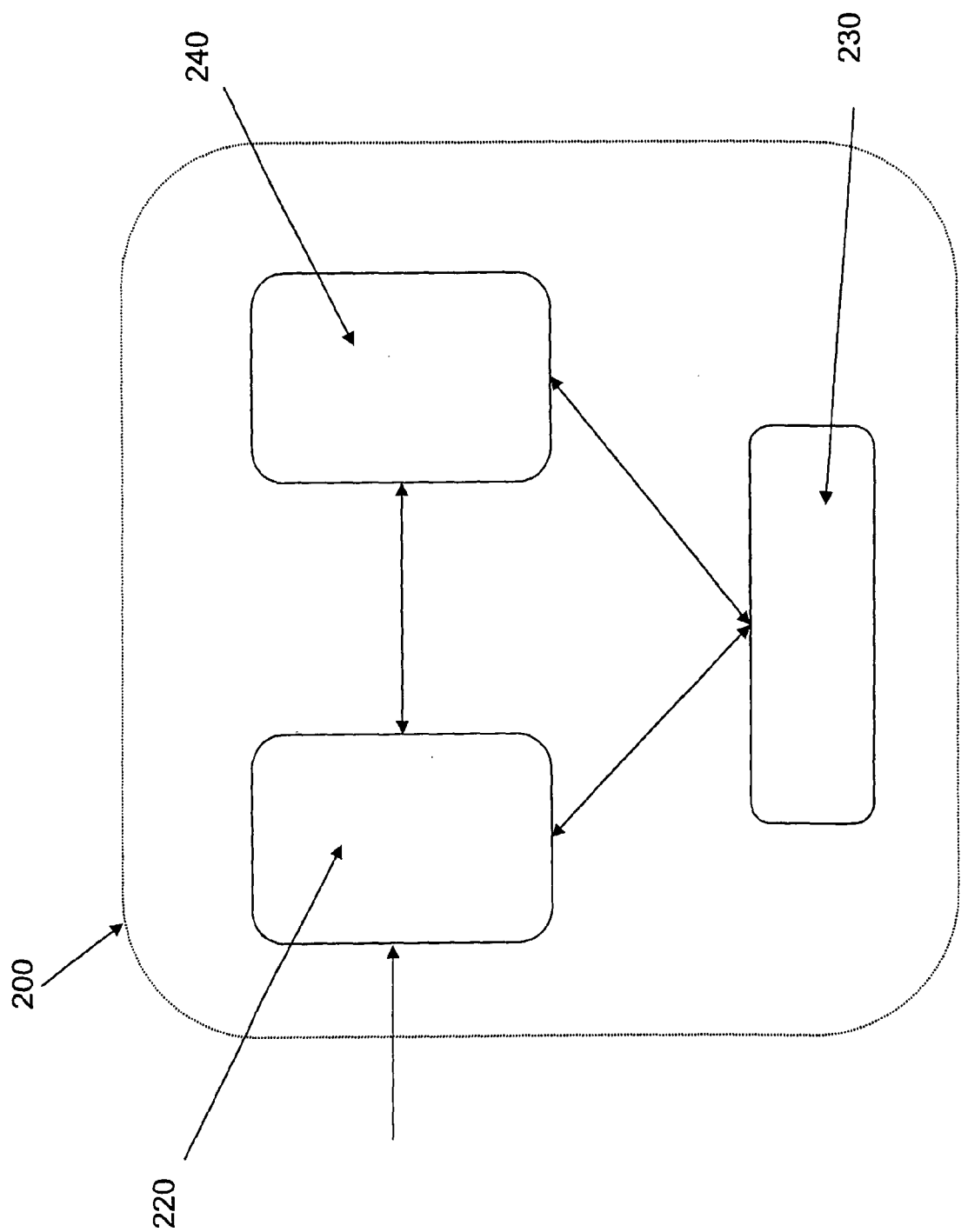
FIG. 4 shows a schematic depiction of the content toolset 200.

A container, referred to as a parcel, is used for UIs, UI updates, and templates for 3rd party involvement. Parcels contain all the information necessary for a 3rd party to produce, test and deliver branded UIs and updates. FIG. 4 shows a schematic depiction of the content toolset 200, which comprises scripting environment 220, test and simulation environment 230 and maintenance environment 240

The parcel process comprise five processing stages:

1) The scripting environment 220 provides the means to design the template for one or more UIs and the update strategy for UIs based on that template.

2) The maintenance environment 240 provides for rapid UI and update production in a well-controlled and guided environment that can be outsourced to content providers.

3) The maintenance environment 240 'pre-flight' functionality allows the deployment administrator to check and tune the UIs and updates that they receive from 3rd parties.

4) The publishing component 110 provides management of UIs and updates at the deployment point, including the staging of new releases.

5) The publishing component 110 enables the automatic generation of updates from live content feeds.

In a typical project, parcels are created within the scripting environment 220 for: a content provider to create re-branded UIs from a template, incorporating the same 'feel' but a different 'look'; a content provider to create updates from a template, that provide a periodic, or user selected variation to UI content; or an ad agency to create updates from a template that promote new services on a periodic basis.

For all of these use cases, maintenance environment 240 is used to import the parcel, re-brand and reconfigure the content and create a new parcel for submission to the publishing component 110. In the design of the UI template, the following issues should be considered: which part of the UI can be re-banded; which features of a UI need to be reconfigured at re-branding or remotely; which part of the UI content may be updated; and if the UI is re-branded then can user select content feeds in use. The scripting environment 220 allows these strategies to be defined, and enables the maintenance environment 240 as the implementer of each instance of each strategy.

A parcel is generated by the scripting environment 220 which comprises a template UI or update for editing. Once editing is complete the parcel is saved in an 'outbox' ready for despatch to the maintenance environment 240 for publishing to the content server. The following 'parcel' functions are provided. The maintenance environment 240 can be used to edit/replace resources held within the parcel. Parcels can be exported to the simulation environment to test the performance of the UI or UI update on a mobile device.

Many different UIs can be derived from a common base. Typically the common base would implement most of the interface itself, and Trigs derived from it would implement small variations on it, such as branding. A Triglet can be derived from a Trig, and it can override any of the resources from the parent Trig that it chooses to (optionally it may introduce its own resources). Note that "resources" here also refers to TrigML, so the behavior and layout of a Trig can be modified by a Triglet just as easily as it replacing a single image or piece of text.

A Parcel may comprise one or more base Trigs (i.e. a Trig that is not derived from any other trig), one or more multiple Trigs derived from a base Trig, a plurality of triglets derived from any of the trigs and a plurality of triglets derived from other triglets.

The parcel format is an opaque binary format that stores all this information as serialized objects. The parcel may comprise a number of resources, such as images, text, URLs, update channels, ringtone files, wallpapers, native applications, etc. Each resource contains permission information as to how to view, edit, or delete the resource. Each resource furthermore contains meta information such as documentation and instructions that are relevant to that resource. Each Parcel tool either assumes a relevant role, or requires users to login as a particular role.

Figure 6:
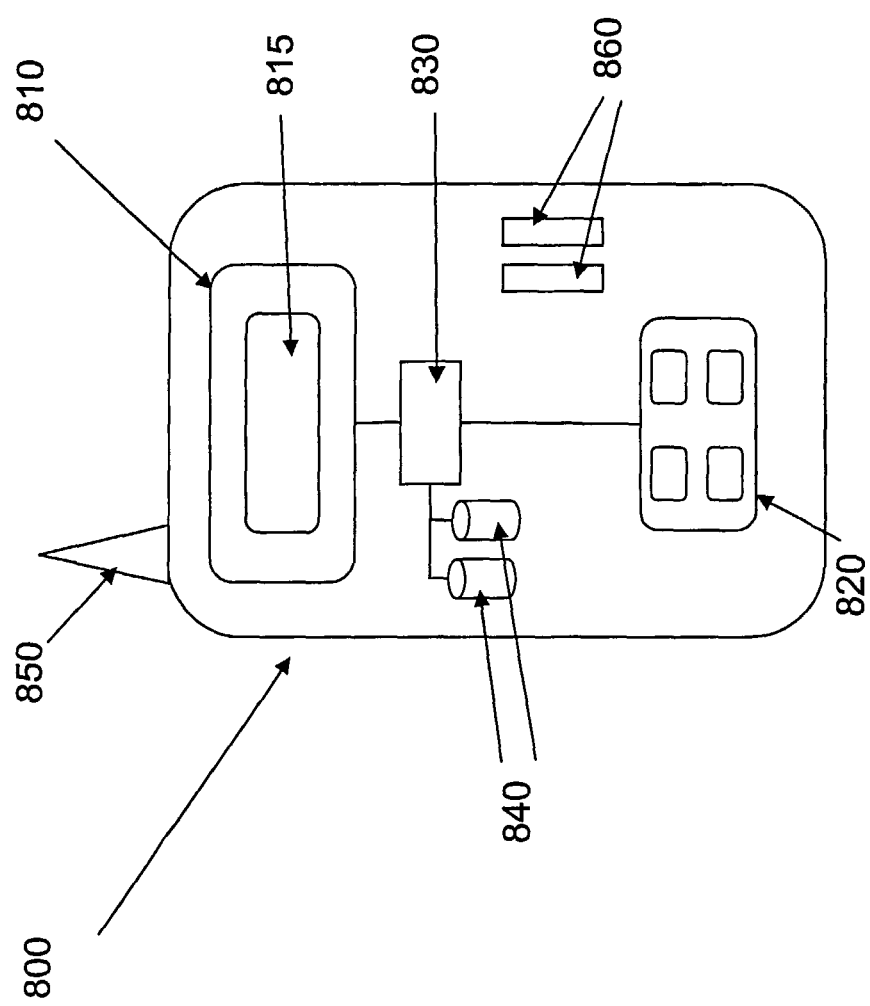
FIG. 6 shows a schematic depiction of a device 800 that comprises a user interface according to an embodiment of the present invention

FIG. 6 shows a schematic depiction of a device 800 that comprises a user interface according to an embodiment of the present invention. The device comprises a display 810 that displays the user interface 815 and user interface means 820, that enable the user to interact with the user interface 815. A processor 830 executes the software that is stored within one or more storage means 840 and there may be provided one or more wireless communication interfaces 850, to enable communication with other devices and/or communication networks. One or more batteries 860 may be received to power the device, which may also comprise interfaces to receive electrical power and/or communication cables.

The nature of these components and interfaces will depend upon the nature of the device. It will be understood that such a user interface can be implemented within a mobile or cellular telephone handset, but it is also applicable to other portable devices such as digital cameras, personal digital organizers, digital music players, GPS navigators, portable gaming consoles, etc. Furthermore, it is also applicable to other devices that comprise a user interface, such as laptop or desktop computers.

The user interface means may comprise a plurality of buttons, such as a numerical or alpha-numerical keyboard, or a touch screen or similar. One or more storage devices may comprise a form of non-volatile memory, such as a memory card, so that the stored data is not lost if power is lost. ROM storage means may be provided to store data which does not need updating or changing. Some RAM may be provided for temporary storage as the faster response times support the caching of frequently accessed data. The device may also accept user removable memory cards and optionally hard disk drives may be used as a storage means. The storage means used will be determined by balancing the different requirements of device size, power consumption, the volume of storage required, etc.

Such a device may be implemented in conjunction with virtually any wireless communications network, for example second generation digital mobile telephone networks (i.e. GSM, D-AMPS), so-called 2.5G networks (i.e. GPRS, HSCSD, EDGE), third generation WCDMA or CDMA-2000 networks and improvements to and derivatives of these and similar networks. Within buildings and campuses other technologies such as Bluetooth, IrDa or wireless LANs (whether based on radio or optical systems) may also be used. USB and/or FireWire connectivity may be supplied for data synchronization with other devices and/or for battery charging.

Computer software for implementing the methods and/or for configuring a device as described above may be provided on data carriers such as floppy disks, CD-ROMS. DVDs, non-volatile memory cards, etc.

This application claims the benefit of UK Patent Application number 0403709.9, filed Feb. 19, 2004, the contents of which are incorporated herein by reference.

APPENDIX A

For file paths beginning with a leading '/':

| | |
|---|---|
| /attrs | Like the unix /proc directory, stores actor attribute values for reference by content when the attribute is needed as a file reference. |
| <actor> | Each subdirectory of /attrs is the actor name. |
| <attribute> | Each attribute is accessed as a node in the actor subdirectory |
| <field> | If the attribute is a structure, then the field name specifies which structure member to access. |
| <index> | If the attribute is a vector attribute, then the index number specifies the index into the vector of the desired attribute. |
| <field> | If the vector attribute is a collection of structures, then the field name again specifies the structure member. |

File paths without a leading '/' are treated as relative to the current trig, i.e. every trig is stored in its own folder hierarchy rooted in a single folder.

| | |
|---|---|
| config | Common folder in every trig to store trig meta data. |
| channels | Common folder to store the update channel definitions. |
| <channel defs> | Set of files defining the collection of update channels for the trig. Each file can define one or more update channels. |
| start-up | Common folder to store entry points for the trig. |
| default | Common TrigML file to store the default entry point for the trig. |
| firsttime | Common TrigML file to store the TrigML for use the first time this trig is run |
| <trigml files> | Other named TrigML files can be used as entry points if found in the start-up folder. |
| constants | This folder is not passed OTA and is instead fully resolved at content compile time. |
| <rest of content> | trig content is organised in trig-defined format under the Trigs folder. |

APPENDIX B

| Trigplayer Actor | Attributes | UpdateState | |
| --- | --- | --- | --- |
| | Messages | exit | |
| | | predial_mode | on/off |
| | Events | idle | |
| Launch Actor | Attributes | | |
| | Messages | browser | url |
| | | SMS | Number |
| | | | message |
| | | Camera | |
| | | Inbox | |
| | | Profiles | |
| | | missed_calls | |
| | | dialer | number |
| | | ... | |
| | | native_app | app_id |
| | | | url |
| | Events | | |
| Install Actor | Attributes | | |
| | Messages | ringtone | resource_path |
| | | wallpaper | resource_path |
| | Events | | |
| Phone Actor | Attributes | Bluetooth | |
| | | IrDA | |
| | | Call | |
| | | GPRS | |
| | | UnreadSMS | |
| | | UnreadVoiceMail | |
| | | UnreadMsgs | |
| | | BatteryLevel | |
| | | SignalStrength | |
| | Messages | | |
| | Events | missed_call | |
| | | message_arrived | |
| | | voice_mail_arrived | |

The invention claimed is:

1. A device, comprising:
   a storage device for storing a plurality of data resources;
   a file system for organizing the plurality of data resources stored in the storage device; and
   a user interface for providing user access to the plurality of data resources, the user interface comprising a plurality of hierarchical planes including a first plane corresponding to a mobile network operator, a second plane corresponding to a device manufacturer, a third plane corresponding to a software provider, and a fourth plane corresponding to a device user, the first plane having priority over the second plane, the second plane having priority over the third plane, and the third plane having priority over the fourth plane, wherein displaying a first user interface element from a higher priority one of the plurality of hierarchical planes in a portion of the user interface takes preference over displaying a second user interface element from a lower priority one of the plurality of hierarchical planes,
   wherein the file system comprises one or more locations comprising directly addressable data resources and one or more locations comprising indirectly addressable data resources, the indirectly addressable data resources being accessible through a data provider, the file system being configured, in use, to provide a single interface from the user interface to both directly addressable data resources and indirectly addressable data resources, and
   wherein the file system comprises a single root that includes both the directly addressable data resources and the indirectly addressable data resources.

2. A device according to claim 1, wherein the directly addressable data resources comprise data content files which, in use, are displayed within the user interface.

3. A device according to claim 1, wherein the indirectly addressable data resources comprise a database and, in use, the result of one or more queries is displayed within the user interface.

4. A device according to claim 1, wherein the indirectly addressable data resources comprise a mark-up language element and, in use, the mark-up language element is rendered and the associated result is displayed within the user interface.

5. A device according to claim 1, further comprising an update manager configured to read an update packet that comprises an update to the file system, wherein the update manager is further configured to generate a network thread and a renderer thread to unpack and install the update, wherein the network thread performs an amount of the update processing.

6. A device according to claim 5, wherein the amount of the update processing is sufficient to interrupt the renderer thread for a shortest possible amount of time.

7. A method of sorting a plurality of data resources within a file system of a device, the method comprising the steps of:
   defining one or more locations comprising directly addressable data resources; and
   defining one or more locations comprising indirectly addressable data resources, the indirectly addressable data resources being accessible through a data provider, wherein the file system provides a single interface from a user interface to access both the directly addressable data resources and the indirectly addressable data resources, and wherein the file system comprises a single root that includes both the directly addressable data resources and the indirectly addressable data resources,
   wherein the user interface comprises a plurality of hierarchical planes including a first plane corresponding to a mobile network operator, a second plane corresponding to a device manufacturer, a third plane corresponding to a software provider, and a fourth plane corresponding to a device user, the first plane having priority over the second plane, the second plane having priority over the third plane, and the third plane having priority over the fourth plane, and
   wherein the method further comprises displaying a first user interface element from a higher priority one of the plurality of hierarchical planes in a portion of the user interface in preference to displaying a second user interface element from a lower priority one of the plurality of hierarchical planes.

8. A method according to claim 7, wherein the method comprises the further step of accessing a directly addressable data resource such that the content of the data resource is displayed within the user interface.

9. A method according to claim 7, wherein the method comprises the further step of accessing an indirectly addressable data resource, the data resource comprising a database such that the result(s) of a database query is displayed within the user interface.

10. A method according to claim 7, wherein the method comprises the further step of accessing an indirectly addressable data resource, the data resource comprising a mark-up language element such that the mark-up language element is rendered and the associated result is displayed within the user interface.

11. A method according to claim 7, further comprising reading an update packet that comprises an update to the file system, and generating a network thread and a renderer thread to unpack and install the update, wherein the network thread performs an amount of the update processing.

12. A method according to claim 11, wherein the amount of the update processing is sufficient to interrupt the renderer thread for a shortest possible amount of time.

13. An apparatus configured to store a plurality of data resources within a file system of a device, comprising:
    means for defining one or more locations comprising directly addressable data resources; and
    means for defining one or more locations comprising indirectly addressable data resources, the indirectly addressable data resources being accessible through a data provider,
    wherein the file system provides a single interface from a user interface to access both the directly addressable data resources and the indirectly addressable data resources,
    wherein the file system comprises a single root that includes both the directly addressable data resources and the indirectly addressable data resources,
    wherein the user interface comprises a plurality of hierarchical planes including a first plane corresponding to a mobile network operator, a second plane corresponding to a device manufacturer, a third plane corresponding to a software provider, and a fourth plane corresponding to a device user, the first plane having priority over the second plane, the second plane having priority over the third plane, and the third plane having priority over the fourth plane, and
    wherein the apparatus further comprises means for displaying a first user interface element from a higher priority one of the plurality of hierarchical planes in a portion of the user interface in preference to displaying a second user interface element from a lower priority one of the plurality of hierarchical planes.

14. The apparatus of claim 13, wherein the directly addressable data resources comprise data content files which, in use, are displayed within the user interface.

15. The apparatus of claim 13, wherein the indirectly addressable data resources comprise a database and, in use, the result of one or more queries is displayed within the user interface.

16. The apparatus of claim 13, wherein the indirectly addressable data resources comprise a mark-up language element and, in use, the mark-up language element is rendered and the associated result is displayed within the user interface.

17. The apparatus according of claim 13, further comprising means for reading an update packet that comprises an update to the file system, and means for generating a network thread and a renderer thread to unpack and install the update, wherein the network thread performs an amount of the update processing.

18. The apparatus according of claim 17, wherein the amount of the update processing is sufficient to interrupt the renderer thread for a shortest possible amount of time.

19. A non-transitory computer-readable storage medium having stored thereon a plurality of data resources within a file system of a device and computer-executable instructions configured to cause a computer of the device to perform operations comprising:
    defining one or more locations comprising directly addressable data resources;
    defining one or more locations comprising indirectly addressable data resources, the indirectly addressable data resources being accessible through a data provider,
    wherein the computer-executable instructions are configured to cause a computer of the device to perform operations such that:
        the file system provides a single interface from a user interface to access both the directly addressable data resources and indirectly addressable data resources;
        the file system comprises a single root that includes both the directly addressable data resources and the indirectly addressable data resources; and
        the user interface comprises a plurality of hierarchical planes including a first plane corresponding to a mobile network operator, a second plane corresponding to a device manufacturer, a third plane corresponding to a software provider, and a fourth plane corresponding to a device user, the first plane having priority over the second plane, the second plane having priority over the third plane, and the third plane having priority over the fourth plane, and
    wherein the computer-executable instructions are configured to cause a computer of the device to perform operations further comprising displaying a first user interface element from a higher priority one of the plurality of hierarchical planes in a portion of the user interface in preference to displaying a second user interface element from a lower priority one of the plurality of hierarchical planes.

20. The non-transitory computer-readable storage medium of claim 19, wherein the computer-executable instructions are configured to cause a computer of the device to perform operations such that the directly addressable data resources comprise data content files which, in use, are displayed within the user interface.

21. The non-transitory computer-readable storage medium of claim 19, wherein the computer-executable instructions are configured to cause a computer of the device to perform operations such that the indirectly addressable data resources comprise a database and, in use, the result of one or more queries is displayed within the user interface.

22. The non-transitory computer-readable storage medium of claim 19, wherein the computer-executable instructions are configured to cause a computer of the device to perform operations such that the indirectly addressable data resources comprise a mark-up language element and, in use, the mark-up language element is rendered and the associated result is displayed within the user interface.

23. The non-transitory computer-readable storage medium of claim 19, wherein the computer-executable instructions are configured to cause a computer of the device to perform operations further comprising:
    causing the computer to read an update packet that comprises an update to the file system; and
    causing the computer to generate a network thread and a renderer thread to unpack and install the update, wherein the network thread performs an amount of the update processing.

24. The non-transitory computer-readable storage medium of claim 23, wherein the computer-executable instructions are configured to cause a computer of the device to perform operations such that the amount of the update processing is sufficient to interrupt the renderer thread for a shortest possible amount of time.

* * * * *